(12) United States Patent
Ohara

(10) Patent No.: US 12,194,946 B2
(45) Date of Patent: Jan. 14, 2025

(54) VEHICLE CENTER AIRBAG DEVICE

(71) Applicant: TOYOTA JIDOSHA KABUSHIKI KAISHA, Toyota (JP)

(72) Inventor: Koji Ohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/416,861

(22) Filed: Jan. 18, 2024

(65) Prior Publication Data

US 2024/0300434 A1    Sep. 12, 2024

(30) Foreign Application Priority Data

Mar. 8, 2023   (JP) ................. 2023-036071

(51) Int. Cl.
*B60R 21/231*   (2011.01)
*B60R 21/2338*  (2011.01)

(52) U.S. Cl.
CPC .... *B60R 21/23138* (2013.01); *B60R 21/2338* (2013.01); *B60R 2021/23146* (2013.01)

(58) Field of Classification Search
CPC .... B60R 2021/23161; B60R 21/23138; B60R 2021/23146; B60R 2021/23382
See application file for complete search history.

(56) References Cited

U.S. PATENT DOCUMENTS

| | | | |
|---|---|---|---|
| 5,647,609 A * | 7/1997 | Spencer | B60R 21/233 |
| | | | 280/730.2 |
| 11,104,292 B2 * | 8/2021 | Fuma | B60N 2/64 |
| 2015/0274111 A1 * | 10/2015 | Ishida | B60R 21/23138 |
| | | | 280/730.2 |
| 2016/0101759 A1 | 4/2016 | Fujiwara | |
| 2016/0129876 A1 * | 5/2016 | Fujiwara | B60R 21/23138 |
| | | | 280/729 |
| 2016/0144821 A1 * | 5/2016 | Fujiwara | B60R 21/207 |
| | | | 280/730.2 |
| 2017/0036636 A1 * | 2/2017 | Masuda | B60R 21/264 |

(Continued)

FOREIGN PATENT DOCUMENTS

| | | | | |
|---|---|---|---|---|
| CN | 215284711 U | * | 12/2021 | |
| DE | 102015010806 A1 | * | 2/2017 | ....... B60R 21/23138 |

(Continued)

OTHER PUBLICATIONS

Aranzulla et al., Gas bag and side impact protection device, Feb. 23, 2017, EPO, DE 10 2015 010 806 A1, Machine Translation of Description (Year: 2017).*

*Primary Examiner* — James A English
(74) *Attorney, Agent, or Firm* — SOLARIS Intellectual Property Group, PLLC

(57) ABSTRACT

A vehicle center airbag device, including: an inflator that is provided at a driver's seat, and that ejects gas due to being actuated; and a center airbag that is provided at a side portion, at a vehicle width direction inner side, of a seatback of the driver's seat, and that inflates and deploys toward a vehicle width direction inner side of an occupant seated in the driver's seat due to the gas being supplied to an interior thereof, wherein the center airbag includes, at a head restraining surface that restrains a head of an occupant seated in a passenger seat, a front and rear pair of concave portions having longitudinal directions along a seat up-down direction.

10 Claims, 6 Drawing Sheets

(56) References Cited

U.S. PATENT DOCUMENTS

| | | | |
|---|---|---|---|
| 2019/0283702 A1* | 9/2019 | Yamada | B60R 21/2338 |
| 2020/0062212 A1* | 2/2020 | Markusic | B60R 21/23138 |
| 2020/0130629 A1* | 4/2020 | Fuma | B60R 21/23138 |
| 2023/0166683 A1* | 6/2023 | Suzuki | B60R 21/231 |
| 2024/0208451 A1* | 6/2024 | Takasawa | B60R 21/237 |

FOREIGN PATENT DOCUMENTS

| | | | |
|---|---|---|---|
| JP | 2016-078506 A | 5/2016 | |
| JP | 2016-088349 A | 5/2016 | |
| JP | 2017-036038 A | 2/2017 | |

\* cited by examiner

VEHICLE CENTER AIRBAG DEVICE

CROSS-REFERENCE TO RELATED APPLICATION

This application is based on and claims priority under 35 USC 119 from Japanese Patent Application No. 2023-036071, filed on Mar. 8, 2023, the disclosure of which is incorporated by reference herein.

BACKGROUND

Technical Field

The present disclosure relates to a vehicle center airbag device.

Related Art

A far-side airbag device in which two partitioning portions (seams) extending in an up-down direction and partitioning an upper portion of a far-side airbag into front and rear are provided as a thickness regulating portion that regulates an inflation thickness at the upper portion of the far-side airbag is conventionally known (for example, refer to Japanese Patent Application Laid-Open (JP-A) No. 2017-036038). The partitioning portions are provided at a front-rear direction central side, and upper ends of the partitioning portions do not reach an upper end of the far-side airbag. Further, a far-side airbag device in which an annular non-inflating portion (seam) is formed at a central side of an airbag body facing a shoulder region of a seated occupant is also conventionally known (for example, refer to Japanese Patent Application Laid-Open (JP-A) No. 2016-078506).

Usually, a center airbag (a far-side airbag) is installed at a seat serving as a driver's seat. Thus, in a case in which seated positions of an occupant seated in the driver's seat and an occupant seated in a passenger seat (positions of the adjacent driver's seat and passenger seat) are significantly deviated from each other in a vehicle front-rear direction, it is necessary to increase a size of the center airbag, particularly in the vehicle front-rear direction, in order to secure sufficient restraining performance with respect to the occupant seated in the passenger seat.

However, considering mountability of the center airbag within a seat, there is a limitation on the increase in size of the center airbag. Further, increasing the size of the center airbag leads to increases in manufacturing costs and mass of the center airbag. Thus, although the size of the center airbag is naturally limited, in a case in which the positions of the adjacent driver's seat and passenger seat are deviated from each other in the vehicle front-rear direction as described above, there is a high probability that a head of the occupant seated in the passenger seat will be separated from a head restraining surface of the center airbag. Namely, it becomes difficult to exert appropriate restraining performance with respect to the head of the occupant seated in the passenger seat.

SUMMARY

The present disclosure provides a vehicle center airbag device that is capable of exerting appropriate restraining performance with respect to a head of an occupant seated in a passenger seat, without increasing a size of a center airbag, even when positions of a driver's seat and the passenger seat, which are adjacent to each other, are deviated from each other in a vehicle front-rear direction.

In order to achieve the above objects, a vehicle center airbag device according to a first aspect of the present disclosure includes: an inflator that is provided at a driver's seat, and that ejects gas due to being actuated; and a center airbag that is provided at a side portion, at a vehicle width direction inner side, of a seatback of the driver's seat, and that inflates and deploys toward a vehicle width direction inner side of an occupant seated in the driver's seat due to the gas being supplied to an interior thereof, wherein the center airbag includes, at a head restraining surface that restrains a head of an occupant seated in a passenger seat, a front and rear pair of concave portions having longitudinal directions along a seat up-down direction.

According to the first aspect, at a time of a side collision of the vehicle, the inflator is actuated, and gas that has been ejected from the inflator is supplied to the interior of the center airbag. Consequently, the center airbag inflates and deploys toward the vehicle width direction inner side of the occupant seated in the driver's seat. It should be noted that "a time of a side collision of the vehicle" includes not only when a side collision of the vehicle has been detected, but also when a side collision of the vehicle has been predicted.

The center airbag includes, at the head restraining surface that restrains the head of the occupant seated in a passenger seat, the front and rear pair of concave portions, each having a longitudinal direction along the seat up-down direction. Accordingly, at the time of a side collision of the vehicle, even if positions of the driver's seat and the passenger seat, which are adjacent to each other, are deviated from each other in a vehicle front-rear direction, the head of the occupant seated in the passenger seat can enter into a concave portion of the center airbag, and is therefore restrained without being separated from the head restraining surface of the center airbag. Namely, according to the present disclosure, appropriate restraining performance is exerted with respect to the occupant seated in the passenger seat, without increasing a size of the center airbag.

Further, a vehicle center airbag device according to a second aspect of the present disclosure is the vehicle center airbag device according to the first aspect, wherein, among the front and rear pair of concave portions, a concave portion at a seat rear side is formed at a position at which the head of the occupant seated in the passenger seat enters into the concave portion at the seat rear side when the driver's seat is at a frontmost side position and the passenger seat is at a rearmost side position.

According to the second aspect, among the front and rear pair of concave portions, the concave portion at the seat rear side is formed at a position at which the head of the occupant seated in the passenger seat enters into the concave portion at the seat rear side when the driver's seat is at the frontmost side position and the passenger seat is at the rearmost side position. Accordingly, at the time of a side collision of the vehicle, even if the positions of the driver's seat and the passenger seat, which are adjacent to each other, are significantly deviated from each other in the vehicle front-rear direction, the head of the occupant seated in the passenger seat is effectively restrained without being separated from the head restraining surface of the center airbag.

Further, a vehicle center airbag device according to a third aspect of the present disclosure is the vehicle center airbag device according to the first aspect or the second aspect, wherein, among the front and rear pair of concave portions, a concave portion at a seat front side is formed at a position at which the head of the occupant seated in the passenger seat enters into the concave portion at the seat front side when the driver's seat is at a rearmost side position and the passenger seat is at a frontmost side position.

According to the third aspect, among the front and rear pair of concave portions, the concave portion at the seat front side is formed at a position at which the head of the occupant seated in the passenger seat enters into the concave portion at the seat front side when the driver's seat is at the rearmost side position and the passenger seat is at the frontmost side position. Accordingly, at the time of a side collision of the vehicle, even if the positions of the driver's seat and the passenger seat, which are adjacent to each other, are significantly deviated from each other in the vehicle front-rear direction, the head of the occupant seated in the passenger seat is effectively restrained without being separated from the head restraining surface of the center airbag.

Further, a vehicle center airbag device according to a fourth aspect of the present disclosure is the vehicle center airbag device of any one of the first aspect to the third aspect, wherein each of the concave portions is formed by a planar tether that connects an inner side base cloth at a driver's seat side and an outer side base cloth at a passenger seat side, at the interior of the center airbag, and a length of each tether along the seat up-down direction at a side of the tether that is sewn together with the outer side base cloth is formed to be shorter than a length of the tether along the seat up-down direction at a side of the tether that is sewn together with the inner side base cloth.

According to the fourth aspect, each of the concave portions is formed by a planar tether that connects the inner side base cloth at the driver's seat side and the outer side base cloth at the passenger seat side, at the interior of the center airbag. Further, the length of each tether along the seat up-down direction at the side of the tether that is sewn together with the outer side base cloth is formed to be shorter than the length of the tether along the seat up-down direction at the side of the tether that is sewn together with the inner side base cloth. Accordingly, the concave portions are appropriately formed with a simple configuration, and occurrence of a head rotation injury is suppressed when restraining the head of the occupant seated in the passenger seat.

Further, a vehicle center airbag device according to a fifth aspect of the present disclosure is the vehicle center airbag device according to any one of the first aspect to the third aspect, wherein the concave portions are respectively formed by boundary portions between the head restraining surface of the center airbag and a front and rear pair of sub-chambers that are provided at the head restraining surface with longitudinal directions thereof being along the seat up-down direction.

According to the fifth aspect, the concave portions are respectively formed by the boundary portions between the head restraining surface of the center airbag and the front and rear pair of sub-chambers that are provided at the head restraining surface with the longitudinal directions thereof being along the seat up-down direction. Accordingly, the concave portions are appropriately formed with a simple configuration, and occurrence of a head rotation injury is suppressed when restraining the head of the occupant seated in the passenger seat.

As described above, according to the present disclosure, appropriate restraining performance can be exerted with respect to the head of the occupant seated in the passenger seat, without increasing the size of the center airbag, even when the positions of the driver's seat and the passenger seat, which are adjacent to each other, are deviated from each other in the vehicle front-rear direction.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be explained in detail below, based on the drawings. It should be noted that, for convenience of explanation, arrow UP appropriately illustrated in the respective drawings indicates an upward direction of a vehicle and a vehicle seat, arrow FR indicates a frontward direction of the vehicle and the vehicle seat, and arrow RH indicates a rightward direction of the vehicle and the vehicle seat. Accordingly, in the following explanation, in cases in which up-down, front-rear, and left-right directions are referred to without any particular notation to the contrary, they respectively indicate up and down, front and rear, and left and right of the vehicle and the vehicle seat. Further, the left-right direction is synonymous with a vehicle width direction and a seat width direction.

Figure 1:
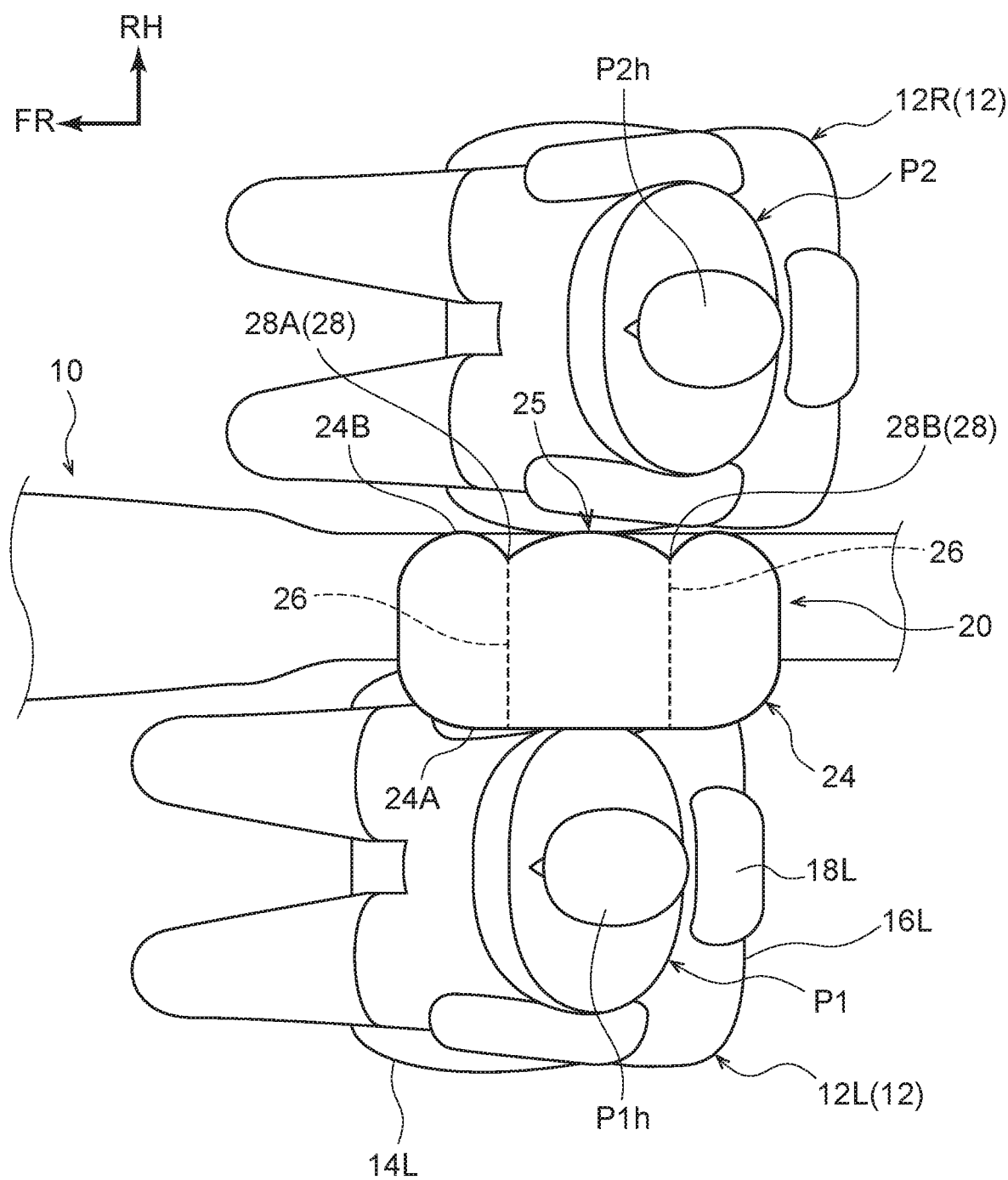
FIG. 1 is a schematic plan view illustrating an inflated and deployed state of a center airbag according to a first exemplary embodiment when a driver's seat is at a frontmost side position and a passenger seat is positioned at a rearmost side position.
Figure 2:
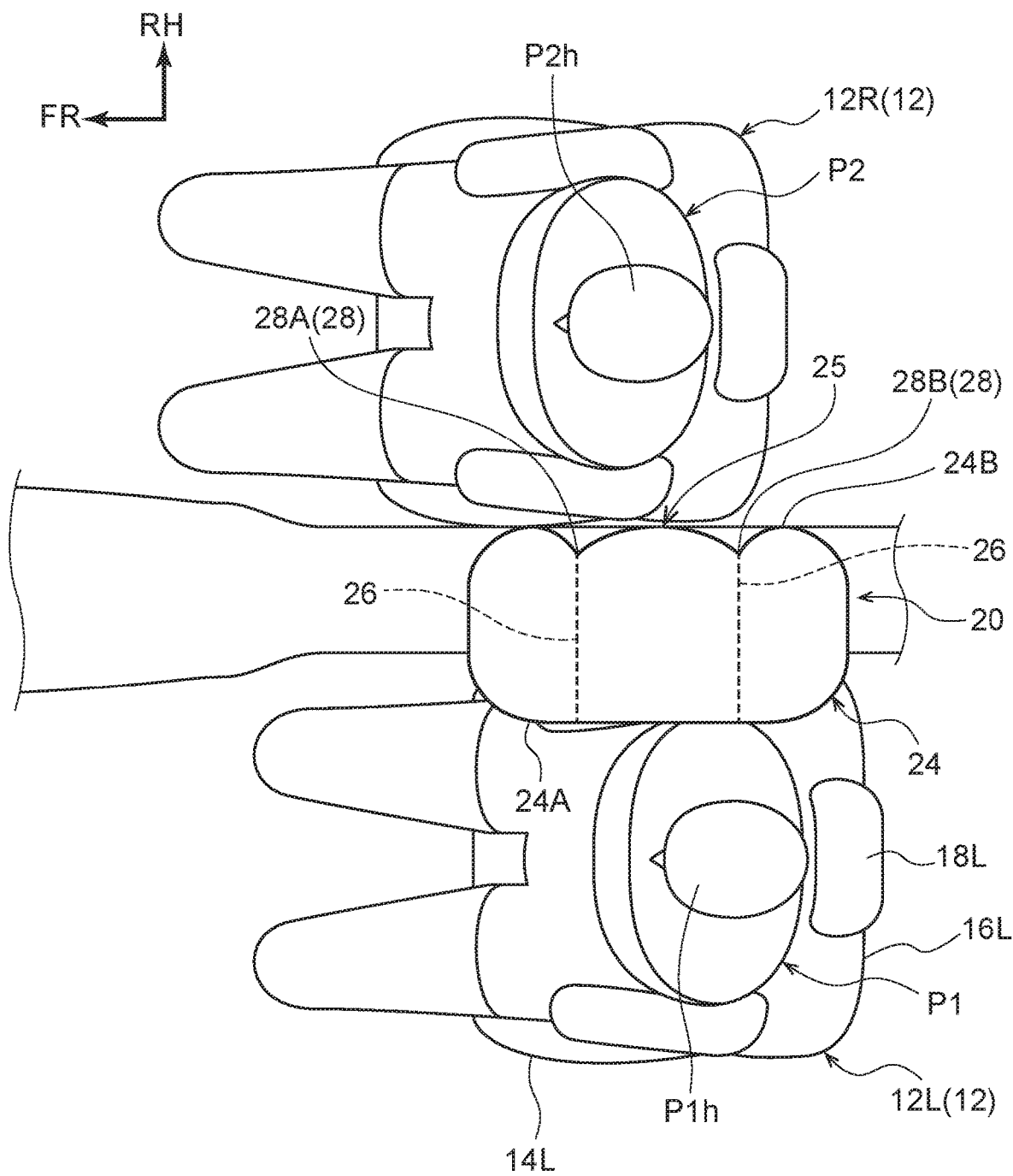
FIG. 2 is a schematic plan view illustrating an inflated and deployed state of the center airbag according to the first exemplary embodiment when the driver's seat is at the rearmost side position and the passenger seat is positioned at the frontmost side position.
Figure 5:
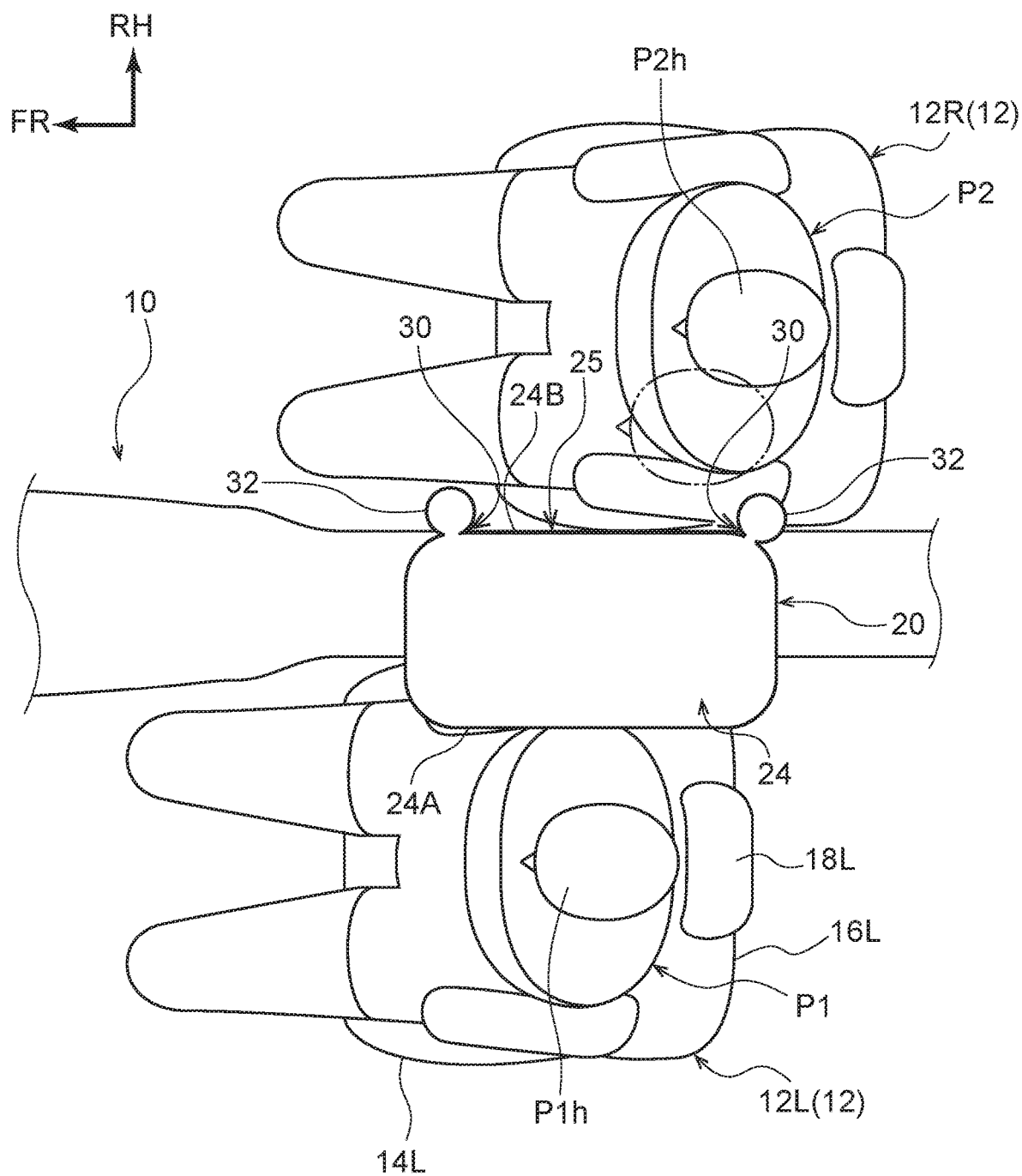
FIG. 5 is a schematic plan view illustrating an inflated and deployed state of a center airbag according to a second exemplary embodiment when the driver's seat is at the frontmost side position and the passenger seat is positioned at the rearmost side position.

Further, as an example, a vehicle 10 illustrated in FIG. 1, FIG. 2, and FIG. 5 is a left-hand drive vehicle, a vehicle seat 12 at a left side is a driver's seat 12L, and a vehicle seat 12 at a right side is a passenger seat 12R. Furthermore, as an example, occupants illustrated in FIG. 1, FIG. 2, and FIG. 5 are occupants corresponding to AM50 (50th percentile of American adult males) World Side Impact Dummies (World SID), and, in the following, an occupant seated in the driver's seat 12L is designated as an "occupant P1", and an occupant seated in the passenger seat 12R is designated as an "occupant P2".

First Exemplary Embodiment

First, a first exemplary embodiment will be explained. As illustrated in FIG. 1 and FIG. 2, the driver's seat 12L at which a vehicle center airbag device (hereafter sometimes simply referred to as a "center airbag device") 20 according to the first exemplary embodiment is installed includes a seat cushion 14L on which the occupant P1 is seated (supporting buttocks and thighs of the occupant P1), a seatback 16L that supports a back of the occupant P1, and a headrest 18L that supports a head P1h of the occupant P1.

In a side view viewed from the vehicle width direction (seat width direction), the seat cushion 14L extends in the front-rear direction, and the seatback 16L is coupled to a rear end portion of the seat cushion 14L so as to be rotatable with the seat width direction as an axial direction, and extends in the up-down direction. The headrest 18L is provided so as to be capable of moving up and down at a seat width direction central portion of an upper end portion of the seatback 16L. It should be noted that the occupant P1 is restrained at the driver's seat 12L by a seatbelt device (not illustrated in the drawings). Further, the passenger seat 12R has a similar configuration to that of the driver's seat 12L, except that the center airbag device 20 is not installed.

Figure 3:
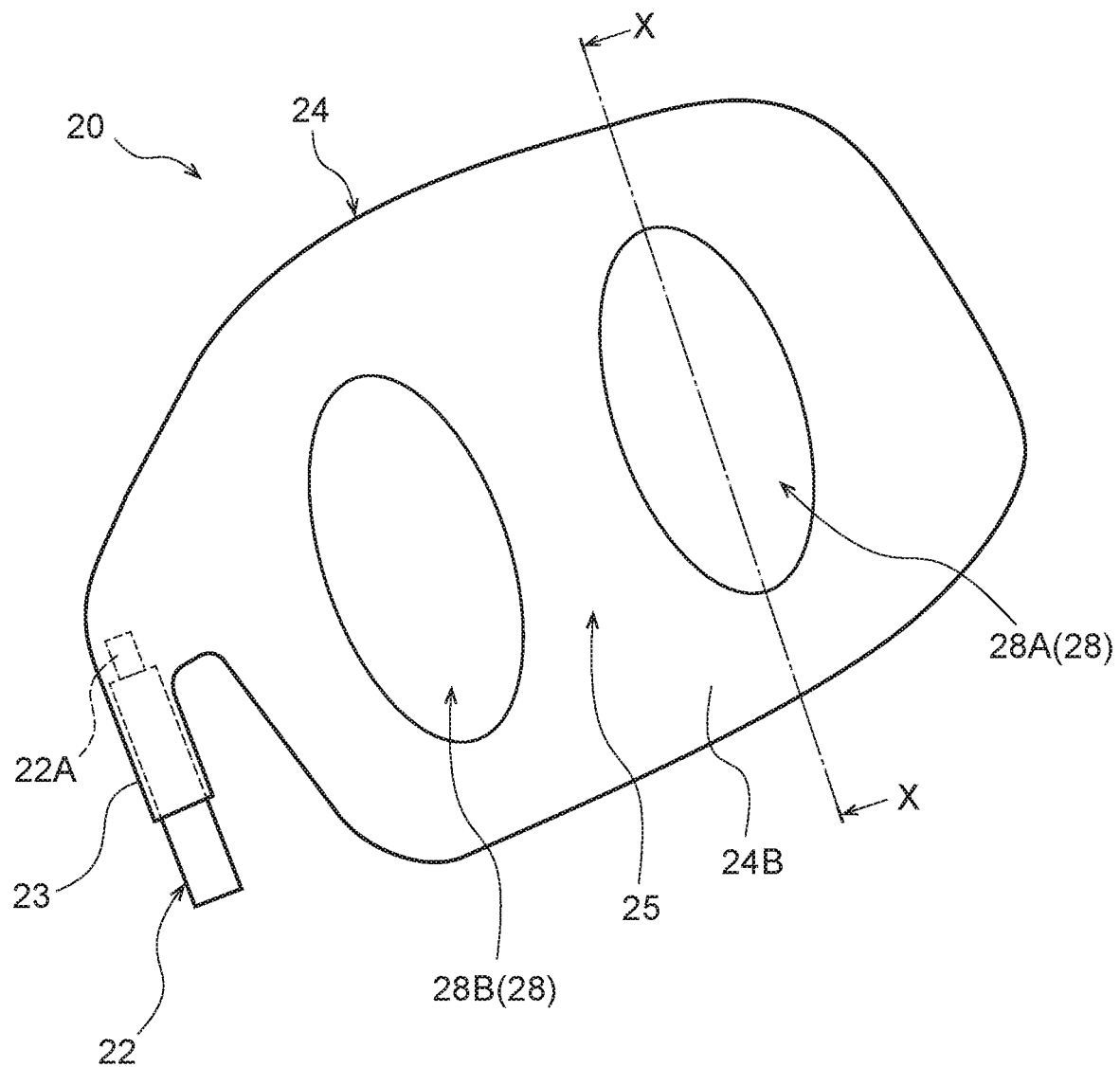
FIG. 3 is a schematic side view illustrating an enlarged view of the center airbag according to the first exemplary embodiment after inflation and deployment have been completed.

The center airbag device 20 is provided at a right side portion, which is a side portion at a vehicle width direction inner side of the seatback 16L of the driver's seat 12L. As illustrated in FIG. 3, the center airbag device 20 is configured to include an inflator 22 that is embedded at the right side portion of the seatback 16L, and a center airbag (far-side airbag) 24 to which gas that has been ejected from the inflator 22 is supplied.

The inflator 22 is a cylinder-type gas generating device formed in a substantially cylindrical shape, an axial direction thereof is a direction (substantially the up-down direction) along a side frame (not illustrated in the drawings) configuring a frame at both left and right side portions of the seatback 16L, and the inflator 22 is attached to the side frame. The inflator 22 is actuated when a side collision of the vehicle 10 has been detected or predicted (hereinafter referred to as "a time of a side collision"), and is capable of instantaneously supplying gas to an interior of the center airbag 24.

The center airbag 24 is formed in a single bag shape by sewing together an outer peripheral edge portion of an inner side base cloth 24A at a seat width direction inner side (driver's seat 12L side) and an outer peripheral edge portion of an outer side base cloth 24B at a seat width direction outer side (passenger seat 12R side), and is folded in a predetermined folding manner to be housed at the right side portion of the seatback 16L.

The center airbag 24 is formed in a substantially elliptical shape with a direction slightly tilted toward a front upper side (and a rear lower side) as a longitudinal direction thereof, so as to be capable of restraining the head P1h of the occupant P1 and a head P2h of the occupant P2, in a side view after inflation and deployment have been completed. Further, a tube-shaped insertion portion 23 extending toward a lower side is formed at a rear end portion of the center airbag 24, and an upper portion 22A including an ejection port of the inflator 22 is inserted into, and connected to, the insertion portion 23.

Figure 4:
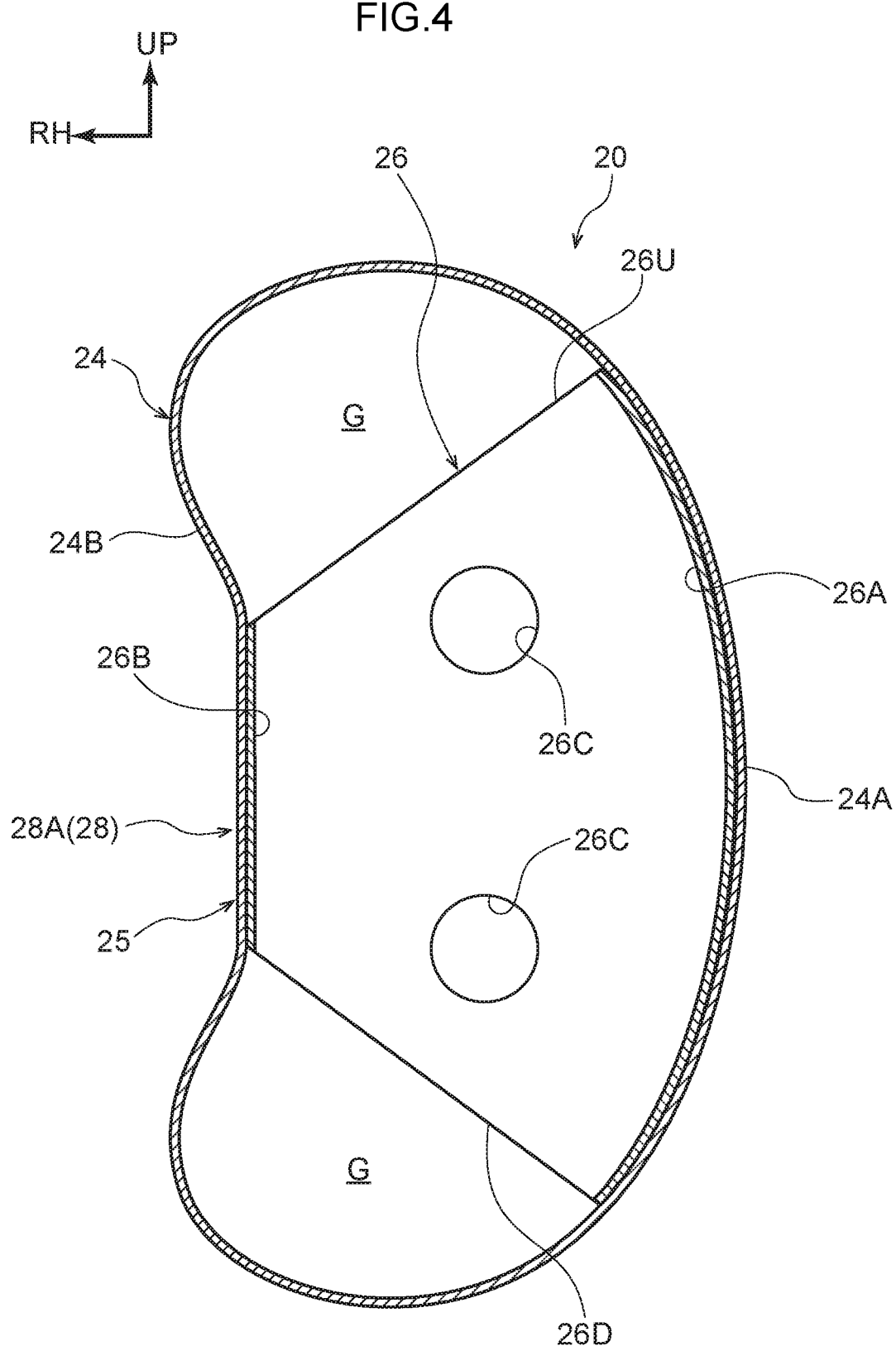
FIG. 4 is an enlarged schematic cross-sectional view taken along line and arrows X-X in FIG. 3.

Further, as illustrated in FIG. 4, a front and rear pair of planar tethers 26 that connect the inner side base cloth 24A and the outer side base cloth 24B are provided at the interior of the center airbag 24 with a predetermined interval therebetween in the front-rear direction. Each of the front and rear pair of tethers 26 is formed in a substantially fan-shaped shape of the same size in a front view, and is formed such that lengths thereof along substantially the up-down direction are different at a side sewn together with the inner side base cloth 24A and at a side sewn together with the outer side base cloth 24B.

Namely, a length along substantially the up-down direction of a seat width direction outer side margin portion (hereafter simply referred to as an "outer side margin portion") 26B, which is at the side of the tether 26 that is sewn together with the outer side base cloth 24B, is formed to be shorter than a length along substantially the up-down direction of a seat width direction inner side margin portion (hereafter simply referred to as an "inner side margin portion") 26A, which is at the side of the tether 26 that is sewn together with the inner side base cloth 24A.

Consequently, as illustrated in FIG. 3, a configuration is provided in which a front and rear pair of concave portions 28 each having a substantially elliptical shape, with substantially the up-down direction as a longitudinal direction thereof, are formed at a head restraining surface 25, which is a surface at a seat width direction outer side of the center airbag 24 after inflation and deployment have been completed (a surface that restrains the head P2h of the occupant P2 seated in the passenger seat 12R).

It should be noted that, among the front and rear pair of concave portions 28, a concave portion 28B at the rear side is formed at a position at which the head P2h of the occupant P2 seated in the passenger seat 12R can enter into the concave portion 28B when the driver's seat 12L is at a frontmost side position and the passenger seat 12R is at a rearmost side position (refer to FIG. 1). Further, a concave portion 28A at the front side is formed at a position at which the head P2h of the occupant P2 seated in the passenger seat 12R can enter into the concave portion 28A when the driver's seat 12L is at the rearmost side position and the passenger seat 12R is at the frontmost side position (refer to FIG. 2).

Further, as illustrated in FIG. 4, plural (for example, two) circular through holes 26C are formed at each tether 26 above and below each other with an interval therebetween, and gaps G having a predetermined size are respectively formed at an upper side of an upper side margin portion 26U and at a lower side of a lower side margin portion 26D of each tether 26. Consequently, even in the configuration in which the front and rear pair of tethers 26 are provided at the interior of the center airbag 24, a configuration is provided such that gas that has been supplied to the interior of the center airbag 24 can be supplied from a rear end portion thereof to a front end portion thereof at an early stage (such that inflation and deployment are not delayed).

Next, operation of the vehicle center airbag device 20 according to the first exemplary embodiment configured as described above will be explained.

At a time of a side collision of the vehicle 10, the inflator 22 is actuated, and gas that has been ejected from the inflator 22 is supplied to the interior of the center airbag 24. When this occurs, an epidermis extending from an upper end portion to a lower end portion of the right side portion of the seatback 16L is broken due to internal pressure (inflation pressure) of the center airbag 24 that has started to be inflated due to the supply of gas.

Namely, the center airbag 24 is inflated and deployed toward a vehicle width direction inner side of the occupant P1 seated in the driver's seat 12L, and at least a right side of the head P1h of the occupant P1 is covered by the center airbag 24. Accordingly, at least a right side surface of the head P1h of the occupant P1 can be restrained by the center airbag 24 at the time of a side collision of the vehicle 10. Further, at least a left side of the head P2h of the occupant P2 seated in the passenger seat 12R can be restrained by the center airbag 24.

To explain more specifically, the center airbag 24 includes the front and rear pair of concave portions 28, each of which has a longitudinal direction along the up-down direction, at the head restraining surface 25 that restrains the head P2h of the occupant P2 seated in the passenger seat 12R. Accordingly, at the time of a side collision of the vehicle 10, even if the positions of the driver's seat 12L and the passenger seat 12R, which are adjacent to each other, are deviated from each other in the front-rear direction, the head P2h of the occupant P2 seated in the passenger seat 12R can enter into a concave portion 28 of the center airbag 24, and is restrained without being separated from the head restraining surface 25 of the center airbag 24.

Namely, according to the vehicle center airbag device 20 according to the first exemplary embodiment, appropriate restraining performance can be exerted at least with respect to the head P2h of the occupant P2 seated in the passenger seat 12R (restraining performance with respect to at least the head P2h of the occupant P2 can be effectively secured), without increasing a size of the center airbag 24 (while achieving size reduction, weight reduction, and cost reduction of the center airbag 24).

Moreover, among the front and rear pair of concave portions 28, the concave portion 28B at the rear side is formed at a position at which the head P2h of the occupant P2 seated in the passenger seat 12R can enter into the concave portion 28B when the driver's seat 12L is at the frontmost side position and the passenger seat 12R is at the rearmost side position. Further, among the front and rear pair of concave portions 28, the concave portion 28A at the front side is formed at a a position at which the head P2h of the occupant P2 seated in the passenger seat 12R can enter into the concave portion 28A when the driver's seat 12L is at the rearmost side position and the passenger seat 12R is at the frontmost side position.

Accordingly, at the time of a side collision of the vehicle 10, the head P2h of the occupant P2 seated in the passenger seat 12R is effectively restrained without being separated from the head restraining surface 25 of the center airbag 24, even if the positions of the driver's seat 12L and the passenger seat 12R, which are adjacent to each other, are significantly deviated from each other in the front-rear direction.

Further, the concave portions 28 are formed by the planar tethers 26 that connect the inner side base cloth 24A and the outer side base cloth 24B at the interior of the center airbag 24. Furthermore, each tether 26 is formed such that the length of the outer side margin portion 26B that is sewn together with the outer side base cloth 24B is shorter than the length of the inner side margin portion 26A that is sewn together with the inner side base cloth 24A.

Accordingly, the concave portions 28, which are capable of effectively restraining the head P2h of the occupant P2, are appropriately formed with a simpler configuration than in a case in which, for example, the length of the outer side margin portion 26B that is sewn together with the outer side base cloth 24B and the length of the inner side margin portion 26A that is sewn together with the inner side base cloth 24A are the same length in the tethers 26. Thus, since the head P2h of the occupant P2 seated in the passenger seat 12R is effectively restrained within a concave portion 28 (held in a state in which rotation is suppressed), occurrence of a head rotation injury can be effectively suppressed or prevented at the time of head restraint.

Second Exemplary Embodiment

Next, a second exemplary embodiment will be explained. It should be noted that portions that are equivalent to those in the first exemplary embodiment are assigned the same reference numerals, and detailed explanation thereof (including common operation) is appropriately omitted.

Figure 6:
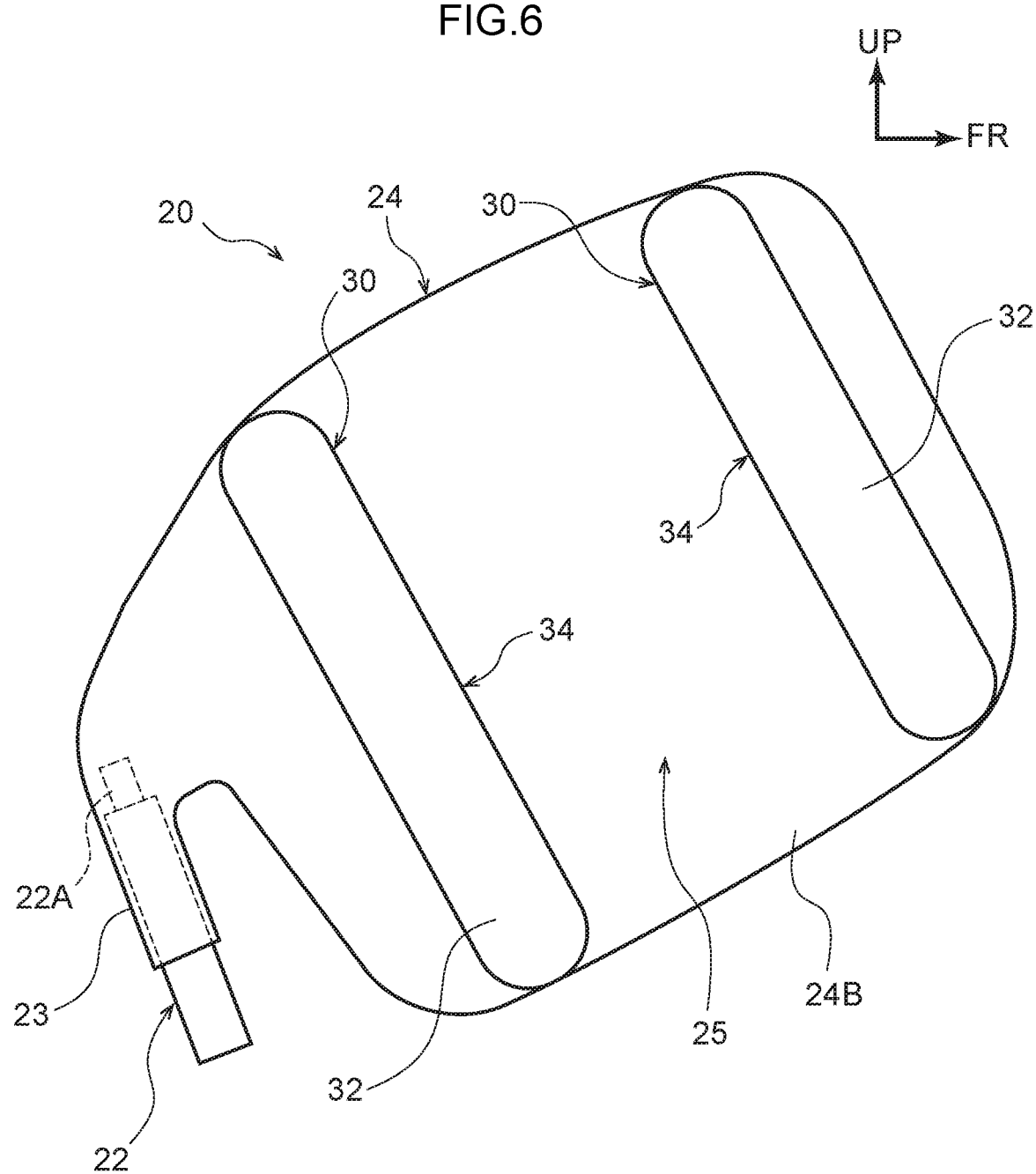
FIG. 6 is a schematic side view illustrating an enlarged view of the center airbag according to the second exemplary embodiment after inflation and deployment have been completed.

As illustrated in FIG. 5 and FIG. 6, the second exemplary embodiment differs from the first exemplary embodiment only in that a front and rear pair of concave portions 30 are formed by a front and rear pair of sub-chambers 32 that are integrally provided at a front end portion and a rear end portion of the head restraining surface 25 of the center airbag 24, respectively, instead of by the tethers 26.

To explain more specifically, each sub-chamber 32 is formed in a substantially columnar shape with a shape thereof, after inflation and deployment have been completed, having an axial direction (longitudinal direction) along the up-down direction, and extends from an upper end surface to a lower end surface of the center airbag 24 in a side view. Further, the concave portions 30 having a function equivalent to that of the concave portions 28 in the first exemplary embodiment are respectively formed by boundary portions 34 (refer to FIG. 6) between the head restraining surface 25 and mutually facing inner side surfaces of outer peripheral surfaces of the respective sub-chambers 32.

Thus, in the second exemplary embodiment as well, the concave portions 30, which can effectively restrain the head P2h of the occupant P2, are appropriately formed with a simple configuration. Accordingly, since the head P2h of the occupant P2 seated in the passenger seat 12R is effectively restrained within a concave portion 30 (held in a state in which rotation is suppressed), occurrence of a head rotation injury can be effectively suppressed or prevented at the time of head restraint.

Although the vehicle center airbag device 20 according to the present exemplary embodiments has been explained above based on the drawings, the vehicle center airbag device 20 according to the present exemplary embodiments is not limited to that which is illustrated in the drawings, and appropriate design modification can be implemented within a range that does not depart from the spirit of the present disclosure. For example, in the first exemplary embodiment, the through holes 26C formed in the tethers 26 are not limited to the two that are illustrated in the drawings.

Further, the inner side margin portions 26A and the outer side margin portions 26B of the tethers 26 are not limited to the configuration in which they are respectively sewn together with the inner side base cloth 24A and the outer side base cloth 24B along their entire lengths. A configuration may be provided in which, for example, only portions at upper end sides and portions at lower end sides of the inner side margin portions 26A and the outer side margin portions 26B of the tethers 26 are respectively sewn together with the inner side base cloth 24A and the outer side base cloth 24B.

What is claimed is:

1. A vehicle center airbag device comprising:
   an inflator that is provided at a driver's seat, and that ejects gas due to being actuated; and
   a center airbag that is provided at a side portion, at a vehicle width direction inner side, of a seatback of the driver's seat, and that inflates and deploys toward a vehicle width direction inner side of an occupant seated in the driver's seat due to the gas being supplied to an interior thereof,
   wherein the center airbag includes, at a head restraining surface that restrains a head of an occupant seated in a passenger seat, a front and rear pair of concave portions having longitudinal directions along a seat up-down direction,
   wherein among the front and rear pair of concave portions, a concave portion at a seat rear side is formed at a position facing the head of the occupant seated in the passenger seat at the seat rear side when the driver's seat is at a frontmost side position and the passenger seat is at a rearmost side position.

2. The vehicle center airbag device according to claim 1, wherein, among the front and rear pair of concave portions, a concave portion at a seat front side is formed at a position at which the head of the occupant seated in the passenger seat enters into the concave portion at the seat front side when the driver's seat is at a rearmost side position and the passenger seat is at a frontmost side position.

3. The vehicle center airbag device according to claim 1, wherein:
   each of the concave portions is formed by a planar tether that connects an inner side base cloth at a driver's seat side and an outer side base cloth at a passenger seat side, at the interior of the center airbag, and
   a length of each tether along the seat up-down direction at a side of the tether that is sewn together with the outer side base cloth is formed to be shorter than a length of the tether along the seat up-down direction at a side of the tether that is sewn together with the inner side base cloth.

4. The vehicle center airbag device according to claim 1, wherein the concave portions are respectively formed by boundary portions between the head restraining surface of the center airbag and a front and rear pair of sub-chambers that are provided at the head restraining surface with longitudinal directions thereof being along the seat up-down direction.

5. The vehicle center airbag device according to claim 2, wherein:
   each of the concave portions is formed by a planar tether that connects an inner side base cloth at a driver's seat side and an outer side base cloth at a passenger seat side, at the interior of the center airbag, and
   a length of each tether along the seat up-down direction at a side of the tether that is sewn together with the outer side base cloth is formed to be shorter than a length of the tether along the seat up-down direction at a side of the tether that is sewn together with the inner side base cloth.

6. The vehicle center airbag device according to claim 2, wherein the concave portions are respectively formed by boundary portions between the head restraining surface of the center airbag and a front and rear pair of sub-chambers that are provided at the head restraining surface with longitudinal directions thereof being along the seat up-down direction.

7. The vehicle center airbag device according to claim 3, wherein the tether is one of a front and rear pair of tethers,
   wherein each of the front and rear pair of tethers is formed in a substantially fan-shaped shape of the same size in a front view.

8. The vehicle center airbag device according to claim 7, wherein plural circular through holes are formed at each tether above and below each other with an interval therebetween, and gaps having a predetermined size are respectively formed at an upper side of an upper side margin portion and at a lower side of a lower side margin portion of each tether.

9. The vehicle center airbag device according to claim 4, wherein the front and rear pair of sub-chambers are integrally provided at a front end portion and a rear end portion of the head restraining surface of the center airbag, respectively, protruding toward the passenger seat.

10. The vehicle center airbag device according to claim 9, wherein the front and rear pair of sub-chambers are each formed in a substantially columnar shape with a shape thereof, after inflation and deployment have been completed, having a longitudinal direction along the up-down direction, and extending from an upper end surface to a lower end surface of the center airbag in a side view.

\* \* \* \* \*